US006813060B1

(12) United States Patent
Garcia et al.

(10) Patent No.: US 6,813,060 B1
(45) Date of Patent: Nov. 2, 2004

(54) ELECTRICAL LATCHING OF MICROELECTROMECHANICAL DEVICES

(75) Inventors: Ernest J. Garcia, Albuquerque, NM (US); Gerard E. Sleefe, Cedar Crest, NM (US)

(73) Assignee: Sandia Corporation, Albuquerque, NM (US)

( * ) Notice: Subject to any disclaimer, the term of this patent is extended or adjusted under 35 U.S.C. 154(b) by 16 days.

(21) Appl. No.: 10/316,172

(22) Filed: Dec. 9, 2002

(51) Int. Cl.[7] .......................... G02B 26/00; G02F 1/01

(52) U.S. Cl. ....................................... 359/291; 359/239

(58) Field of Search ............................... 359/291, 196, 359/237, 239

(56) References Cited

U.S. PATENT DOCUMENTS 5,867,302 A 2/1999 Fleming ..................... 359/291
6,025,951 A 2/2000 Swart ......................... 359/245
6,198,180 B1 3/2001 Garcia ......................... 310/36
6,220,561 B1 4/2001 Garcia ........................ 248/487
6,618,518 B1 * 9/2003 Mahadevan et al. .......... 385/18

OTHER PUBLICATIONS

Ernest J. Garcia, Marc A. Polosky and Gerard E. Sleefe, "Silicon Micromirrors and Their Prospective Application in the Next Generation Space Telescope," Paper presented at the Society of Photooptical Instrumentation Engineers (SPIE) 47th Annual Meeting, Seattle, WA, Jul. 7–11, 2002.

* cited by examiner

*Primary Examiner*—Hung Xuan Dang
*Assistant Examiner*—Joseph Martinez
(74) *Attorney, Agent, or Firm*—John P. Hohimer

(57) ABSTRACT

Methods are disclosed for row and column addressing of an array of microelectromechanical (MEM) devices. The methods of the present invention are applicable to MEM micromirrors or memory elements and allow the MEM array to be programmed and maintained latched in a programmed state with a voltage that is generally lower than the voltage required for electrostatically switching the MEM devices.

27 Claims, 7 Drawing Sheets

ELECTRICAL LATCHING OF MICROELECTROMECHANICAL DEVICES

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to microelectromechanical (MEM) devices, and in particular to a method for electrically addressing an array of MEM devices such as an array of MEM micromirrors or MEM memory elements to latch selected MEM devices in an actuated state.

BACKGROUND OF THE INVENTION

Arrays of microelectromechanical (MEM) devices can be used for redirecting or switching light beams and for forming optical or mechanical memories for storing information. Surface micromaching based on conventional semiconductor integrated circuit (IC) processing technology allows such arrays of MEM devices to be formed integrally on a substrate without the need for piece part assembly. Many different designs of MEM micromirrors have been disclosed that can be used in such an array (see e.g. U.S. Pat. Nos. 5,867,302; 6,025,951; 6,198,180 and 6,220,561). With present addressing schemes, each MEM micromirror to be latched must be individually actuated so that a large number of electrical connections and attendant electronic circuitry are required for the operation of a MEM micromirror array. For example, an array of m×n MEM micromirrors, where m and n are each integer numbers, currently requires m times n electrical connections since each MEM device in the array must be operated and addressed independently so that it can be latched. What is needed is a way to simplify the number of electrical connections for addressing a large array of MEM micromirrors or other types of MEM devices which are to be formed as arrays. The present invention provides a solution to this problem by providing a method for addressing an array of m×n MEM micromirrors that requires a minimum of m+n electrical connections, thereby greatly simplifying the number of electrical connections and attendant electronic circuitry. The present invention is also useful for electrically addressing an array of MEM memory elements and any other type of MEM device which is formed as an array that must be electrically addressed for activation or readout.

SUMMARY OF THE INVENTION

The present invention relates to a method for electrically addressing an array of microelectromechanical (MEM) devices which can comprise, for example, micromirrors or memory elements or both. The method of the present invention comprises steps for switching all of the MEM devices in a column of the array from a first state to a second state; selecting a set of the MEM devices located at an intersection of at least one row of the array and the column, with the set of MEM devices being in the second state; switching all the MEM devices in the column of the array, except for the set of the MEM devices, from the second state to the first state; and repeating the above steps for each column of the array. The method of the present invention allows latching of particular MEM devices in the second state until all electrical power is removed from the MEM array.

The step for switching all of the MEM devices in the column of the array from the first state to the second state can comprise applying an actuation voltage to all of the MEM devices in the column of the array for electrostatically switching the MEM devices from the first state to the second state. The step for selecting the set of the MEM devices can comprise applying a holding voltage to all of the MEM devices in one or more rows of the array, with the holding voltage being of insufficient magnitude to switch any of the MEM devices in the rows from the first state to the second state, but being of sufficient magnitude to maintain the set of MEM devices in the second state after removal of the actuation voltage (i.e. the holding voltage latches the MEM devices in whichever state they were already in when the holding voltage is applied). The step for switching all the MEM devices in the column of the array, except for the set of the MEM devices, from the second state to the first state can comprise the steps of removing the actuation voltage from all the MEM devices in the column of the array; applying a maintaining voltage to all the MEM devices in the column of the array: and removing the holding voltage from all the MEM devices in the row of the array. The maintaining voltage can be either equal in magnitude with the holding voltage or can be different in magnitude from the holding voltage.

Applying the actuation voltage to all of the MEM devices in the column of the array can be performed by applying the actuation voltage to a first electrode underlying a moveable member of each MEM device in the column of the array, while applying the holding voltage to all of the MEM devices in the row of the array can be performed by applying the holding voltage to a second electrode underlying the moveable member of each MEM device in the row of the array. The maintaining voltage can be applied to the first electrode or to a third electrode underlying the moveable member of each MEM device in the column of the array depending upon a structure of the MEM device used with the method of the present invention.

The method of the present invention can further comprise a step for sensing whether one of the MEM devices in the array is in the first state or in the second state at an instant in time. The sensing step can be performed either capacitively (e.g. by using the capacitance between the moveable member and a sensing electrode underlying or overlying the moveable member) or optically (e.g. by providing a light beam incident on a surface of the moveable member and sensing the angular position or phase of a reflected component of the incident light beam).

The present invention also relates to a method for electrically addressing an array of MEM devices, comprising steps for applying an actuation voltage to all of the MEM devices in a column of the array, thereby electrostatically actuating all of the MEM devices in the column; applying a holding voltage to all of the MEM devices in at least one row of the array, thereby selecting the MEM devices located at an intersection of the row and the column, with the holding voltage being of insufficient magnitude to electrostatically actuate any of the MEM devices in the row, but being of sufficient magnitude to maintain the actuation of the MEM devices located at the intersection of the row and the column when the actuation voltage to the column is removed; removing the actuation voltage from the column, and applying a maintaining voltage to the column; removing the holding voltage from the row; and repeating each of the steps listed above for each column in the array.

The step for applying the actuation voltage to all of the MEM devices in the column of the array can comprise applying the actuation voltage to a first electrode underlying a moveable member of each MEM device in the column of the array to electrostatically change a position of the moveable member from a first state to a second state. The step for applying the holding voltage to all of the MEM devices in the row of the array can comprise applying the holding voltage to a second electrode underlying the moveable member of each MEM device in the row of the array.

The step for removing the actuation voltage from the column and applying the maintaining voltage to the column can comprise removing the actuation voltage from the first electrode and applying the maintaining voltage to the first electrode. Alternately the maintaining voltage can be applied to a third electrode underlying the moveable member of each MEM device in the column of the array. The maintaining voltage can be equal in magnitude to the holding voltage or different therefrom depending upon a particular structure of the MEM devices in the array.

The method of the present invention can further include a step for sensing the position of the moveable member of one or more MEM devices in the array for determining the state of the MEM devices at a particular time. Sensing the position of the moveable member in the MEM devices can be performed by either capacitively sensing the position or optically sensing the position.

The definition of the first and second states will in general depend upon the exact structure of the MEM devices and the extent to which the moveable member can be switched in position or angle. As an example, in certain embodiments of the present invention, the first state can be defined by the moveable member being coplanar with a substrate whereon the array is formed; and the second state can be defined by the moveable member being tilted at an angle to the substrate. In other embodiments of the present invention, the first state can be defined by the moveable member being located in an as-formed position; and the second state can be defined by the moveable member being displaced downward from the as-formed position. In yet other embodiments of the present invention, the first state can be defined by the moveable member being oriented at an angle to a substrate whereon the array is formed; and the second state can be defined by the moveable member being oriented at a different angle with respect to the substrate. The present invention is applicable to arrays of MEM devices in the form of micromirrors, memory elements or both.

The present invention further relates to a method for electrically addressing an array of MEM devices formed on a substrate, comprising steps for applying an actuation voltage to all of the MEM devices in a column of the array, thereby electrostatically actuating all of the MEM devices in the column to change the position of a moveable member of each MEM device from a first state to a second state; selecting a set of the MEM devices in the column that will remain in the second state when a maintaining voltage having a magnitude less than the actuation voltage will be later substituted for the actuation voltage; and repeating the above two steps for each column in the array. The step for selecting the set of MEM devices further comprises applying a holding voltage to one or more rows of the array while the actuation voltage is applied to the column, thereby selecting the MEM devices having both the actuation voltage and the holding voltage applied thereto for the set of MEM devices, with the holding voltage being of insufficient magnitude to electrostatically actuate any of the MEM devices in the column, but being of sufficient magnitude to maintain any MEM device in the column to which the holding voltage is applied in the second state when the actuation voltage is no longer present; substituting the maintaining voltage for the actuation voltage while retaining the holding voltage in place; and removing the holding voltage. Each MEM device in the array can comprise, for example, a micromirror or a memory element or both.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
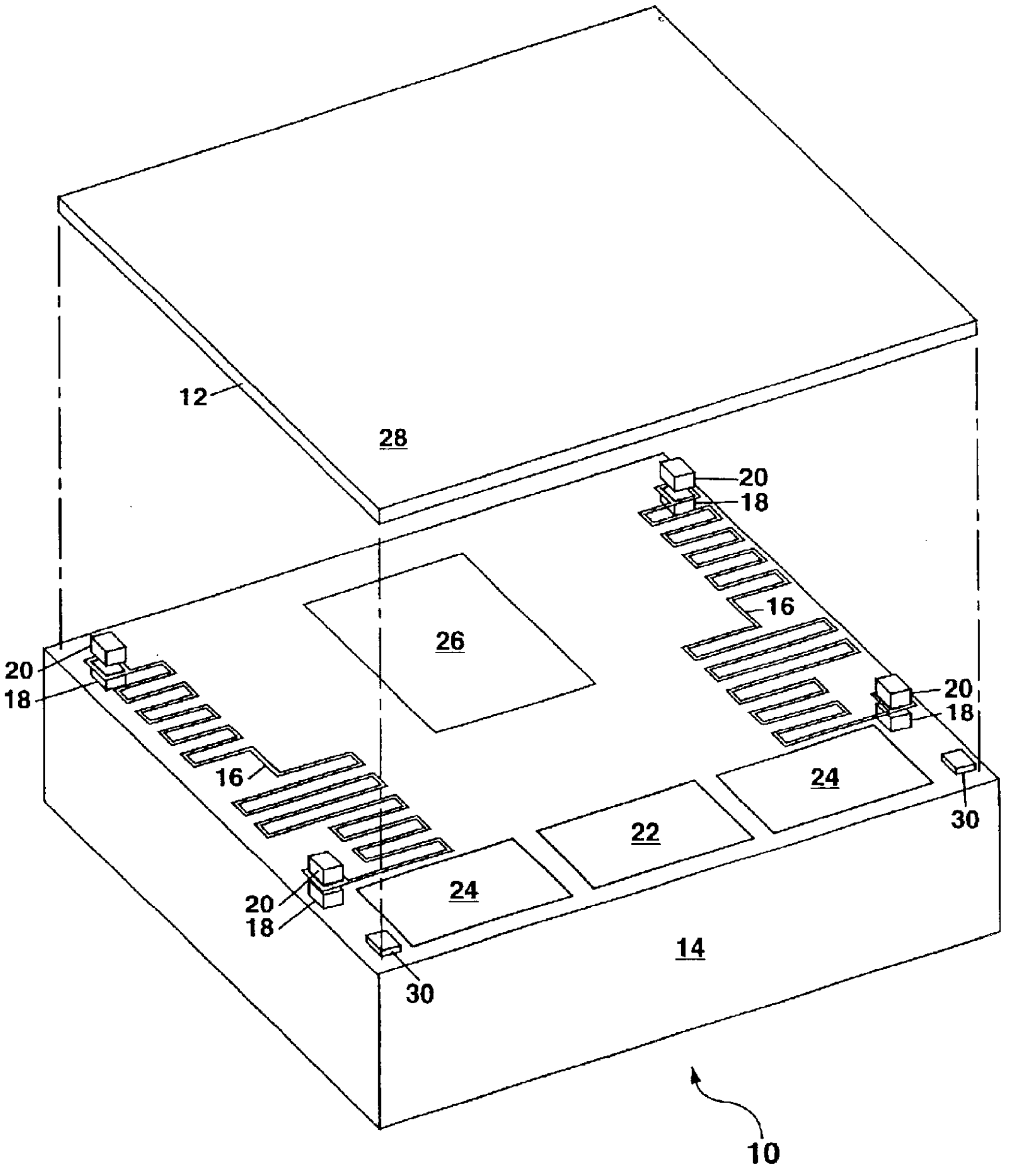
FIG. 1 schematically illustrates a perspective view of an example of a MEM device that can be used to form a MEM device array which can be addressed using the method of the present invention. A moveable element of the MEM device is shown elevated above the remainder of the MEM device to show a plurality of electrodes which underlie the moveable element for electrically addressing the MEM device and for sensing a state of the moveable element.

Referring to FIG. 1, there is shown a schematic representation of a first example of a MEM device 10 that can be formed as an array 100 and electrically addressed using the method of the present invention. In FIG. 1, the MEM device 10 comprises a moveable member 12 which, in this example, is a planar platform that can have lateral dimensions of, for example, 50–200 μm and can be, for example, 2–4 μm thick. The moveable member 12 is suspended above a common substrate 14, together with a plurality of other generally identical MEM devices 10 which are arranged on the substrate 14 to form the array 100 having a plurality of rows and columns (see FIG. 3).

The MEM device 10 in FIG. 1 can be formed by surface micromachining as known to the art which is based on a series of well-known semiconductor processing steps that can be repeated numerous times to build up the structure of a plurality of the MEM devices 10 on a common substrate 14 layer by layer. This build-up of the MEM devices 10 generally involves depositing and patterning a plurality of layers of polysilicon and a sacrificial material (e.g. silicon dioxide or a silicate glass). After the build-up of the MEM devices 10 is completed, the sacrificial material can be removed by a selective etchant comprising hydrofluoric acid (HF) that removes exposed portions of the sacrificial material, but which does not substantially chemically attack the polysilicon or any other deposited layers (e.g. comprising silicon nitride, metals or metal alloys). This removal of the exposed sacrificial material releases each MEM device 10 for movement. Each successively deposited layer of polysilicon and sacrificial material can be patterned, as needed, after deposition to define features of the MEM devices 10 in that layer.

In the example of FIG. 1, the MEM device 10 further comprises a plurality of springs 16 which flexibly connect the moveable member 12 to the substrate 14 to allow for movement of the member 12 between a pair of angular states upon electrical actuation of the device 10. On end of each spring 16 in the example of the MEM device 10 in FIG. 1 is attached to the substrate 14 at the location of a mechanical stop 18 formed on the substrate 14, and the other end of each spring 16 is connected to a leg 20 that protrudes downward underneath the moveable member 12. The stops 18 and legs 20 can have dimensions which are generally up to a few microns in each direction. In FIG. 1, the legs 20 are shown detached from the moveable member 12 for clarity.

Figure 2A:
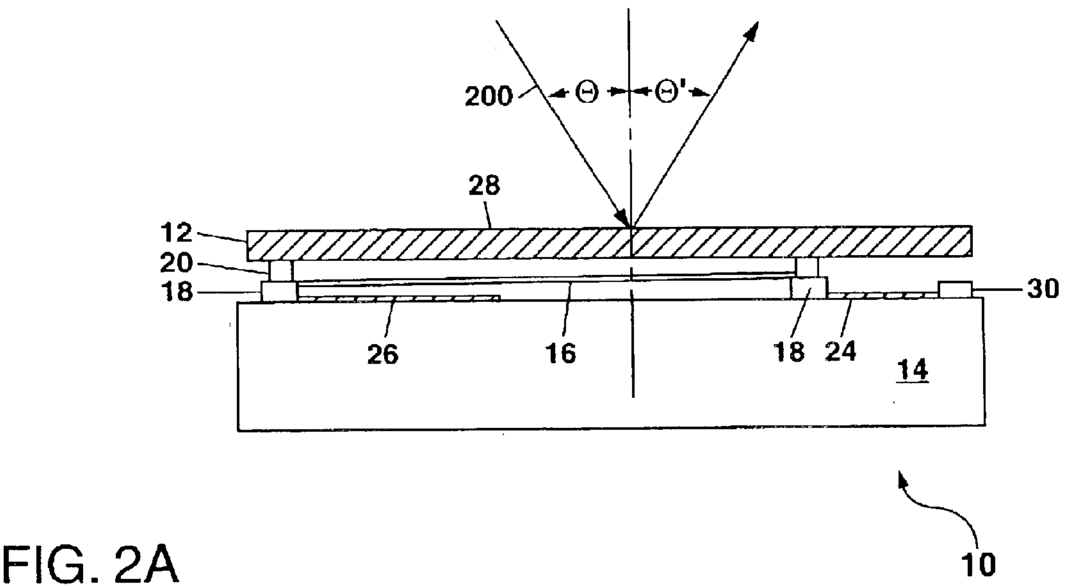
FIGS. 2A and 2B show schematic side views of the MEM device of FIG. 1 to illustrate electrical addressing and switching of the device between a pair of angular states therein.
Figure 2B:
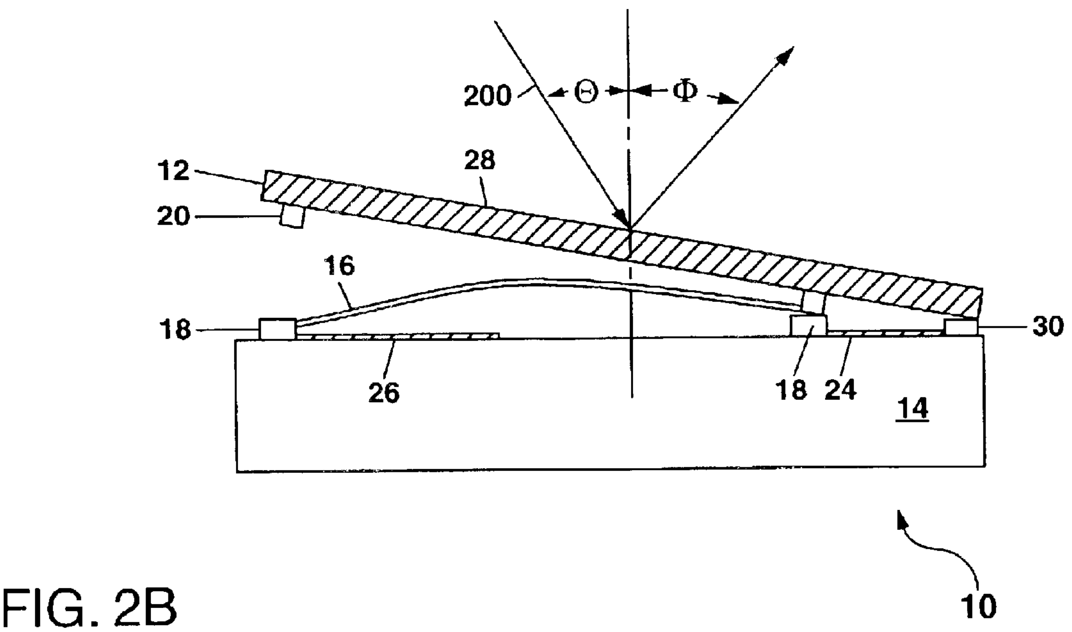

The moveable member 12 is tiltable between a first angular state wherein the member 12 is substantially coplanar to the substrate 14 (i.e. oriented at an angle of 0° with respect to the substrate 14 as shown in FIG. 2A) and a second angular state wherein the member 12 is tilted at an angle (e.g. 10°) with respect to the substrate 14 (see FIG. 2B). Electrical activation of the MEM device 10 and addressing the device 10 located in the midst of the array 100 can be performed using an actuation electrode 22 and a pair of holding electrodes 24 located on either side of the actuation electrode 22. The MEM device 10 in FIG. 1 can be termed a "volatile" device since electrical activation is necessary to switch the device 10 from the first angular state to the second angular state and to maintain the device 10 in the second angular state. When all electrical power to the MEM device 10 is removed, the latched MEM device 10 reverts to the first angular state due to a restoring force provided by the springs 16.

Figure 4:
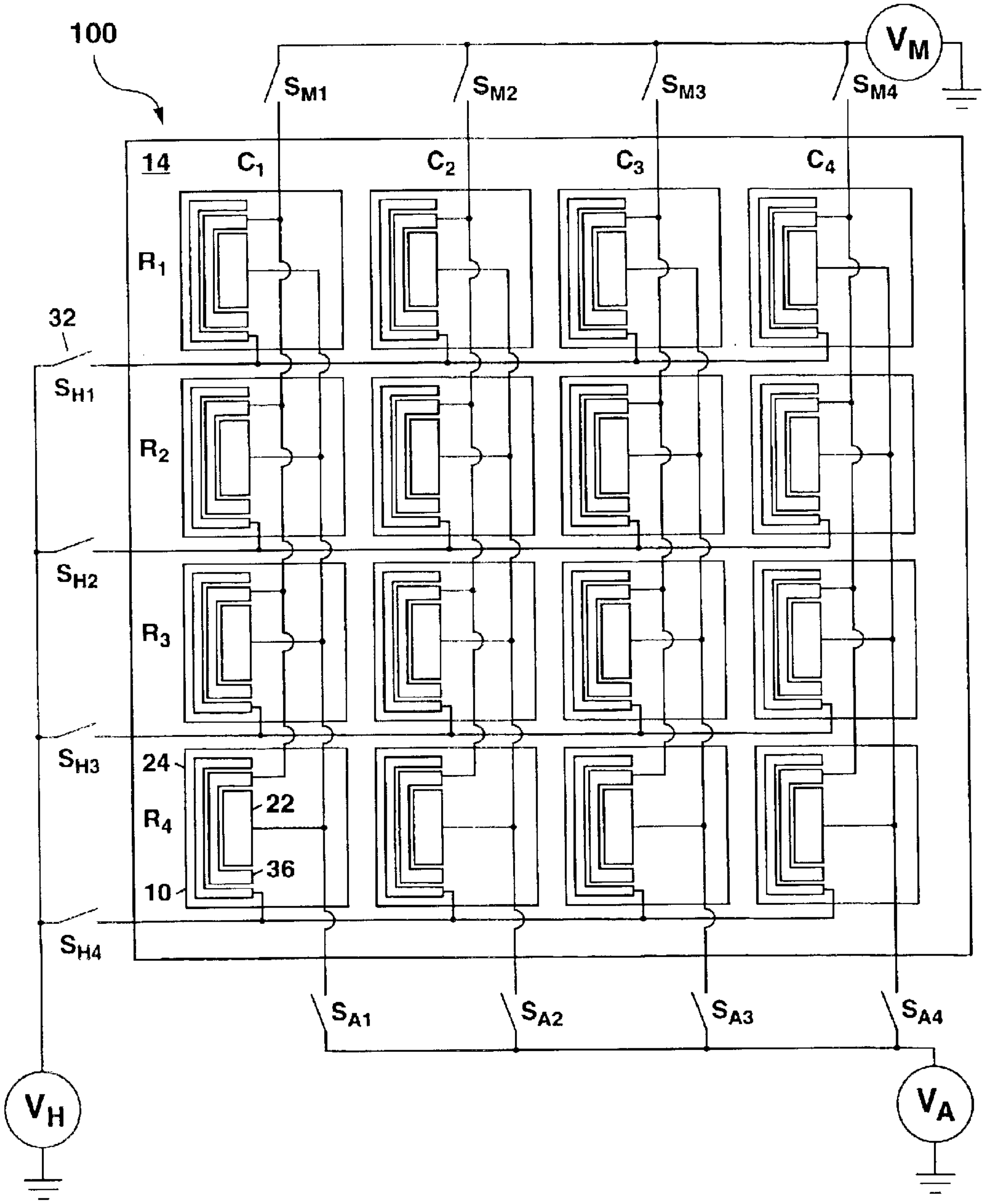
FIG. 4 shows a schematic plan view of an array of MEM devices as in FIG. 1, but with a nested electrode arrangement that includes a maintaining electrode, to illustrate a second embodiment of the method of the present invention for electrically addressing the array.

In FIG. 1, one or more optional sense electrodes 26 can be provided on the substrate 14 underneath the moveable member 12 for capacitively sensing which angular state the MEM device 10 is in at a particular instant in time. Such sense electrodes 26 are useful for forming a volatile microelectromechanical memory array 100 which utilizes the two angular states of each MEM device 10 to store information that can be retrieved at any time by electrical addressing of the sense electrodes 26. As an alternative to the use of a dedicated sense electrode 26, any of the electrodes 22 or 24 (or 36 in the case of a separate maintaining electrode as shown in FIG. 4) can be used to capacitively sense the state of the MEM device 10. This can be done either when no operational voltage (i.e. $V_A$, $V_H$ or $V_M$) is present on one of the electrodes 22, 24 or 36 used for capacitively sensing of the state of the MEM device 10, or in some embodiments of the present invention even when an operational voltage is present. In the latter case, when an operational voltage $V_A$, $V_H$ or $V_M$ is present, an additional alternating current (a.c.) voltage can be superimposed upon the operational voltage $V_A$, $V_H$ or $V_M$ and used for capacitively sensing the state of the MEM device 10.

In FIG. 1, when each MEM device 10 in the array 100 is to be used as a micromirror for reflecting and thereby redirecting an incident light beam 200, an upper surface 28 of each moveable member 12 can be made light reflective (e.g. by polishing the upper surface 28, or by depositing a mirror coating thereon or both). Such an array 100 of MEM micromirrors 10 which can be individually latched has applications for use in switching light beams for fiber optic communications, for optical information processing, for optical computing, for image display projection, or for forming a volatile optical memory. To form a volatile optical memory using the device 10 of FIG. 1, the position or angle of a reflected portion of the incident light beam 200 can be sensed (e.g. with a photodetector array) to determine the angular state of each MEM device 10 in the array 100.

FIGS. 2A and 2B show schematic side views of the MEM device 10 of FIG. 1 to illustrate electrical addressing and switching of the MEM device 10 between the first and second angular states.

In FIG. 2A, the MEM device 10 is in an "as-formed" position which corresponds to the first angular state wherein the moveable member 12 is oriented parallel to the substrate 14. In the first angular state, an incident light beam 200 which is directed towards the upper surface 28 of the moveable member 12 at an angle of incidence Θ with respect to an axis normal to the substrate 14 will be reflected off the upper surface 28 at an equal and opposite angle Θ'.

In FIG. 2B, the MEM device 10 is switched to the second angular state by applying an actuation voltage $V_A$ to the actuation electrode 22 with the moveable member 12 being electrically grounded through the springs 16. The exact actuation voltage $V_A$ required for switching of the MEM device 10 will depend upon a number of factors including the size of the electrode 22, a spacing between the electrode 22 and the moveable member 12, the compliance of the springs 16 and whether a flexible capacitor plate is provided underneath the moveable member 12 as disclosed, for example, in U.S. Pat. No. 6,220,561 which is incorporated herein by reference. As an example, the actuation voltage $V_A$ can be in the range of 30–100 volts.

The actuation voltage $V_A$ generates an electrostatic force of attraction between the moveable member 12 and electrode 22 which urges the moveable member 12 to tilt about a pair of the legs 20 and stops 18 as shown in FIG. 2B. As the vertical spacing between a side of the moveable member 12 which is urged downward towards the actuation electrode 22 is decreased, the electrostatic force of attraction increases so that a smaller voltage can be used to urge the member 12 downwards further or to hold the moveable member 12 in the second angular state. In the second angular state, the incident light beam 200 is reflected off the upper surface 28 at a different angle Φ which is equal to the angle of incidence, Θ, plus the maximum angle of tilt of the moveable member 12.

In FIG. 2B, an end-stop 30 can be provided on the substrate 14 to limit further movement of the member 12 and to define a maximum tilt angle for the member 12. The end-stop 30 is also useful to prevent an electrical short circuit from being formed by contact of the moveable member 12 and the actuation electrode 22 when the electrode 22 is not overcoated with a thin layer of an electrically insulating material (e g. silicon nitride).

In FIG. 2B, once the moveable member 12 has been switched from the first angular state to the second angular state, the MEM device 10 can be held in the second state by a holding voltage $V_H$ which can be provided the pair of holding electrodes 24. This is useful for addressing a plurality of MEM devices 10 in an array 100 as will be described in detail hereinafter. The holding voltage $V_H$ is preferably selected to provide a voltage that is of sufficient magnitude to maintain the MEM device 10 latched in the second state after removal of the actuation voltage $V_A$ from the actuation electrode 22, but is also of insufficient magnitude to switch the MEM device 10 from the first angular state to the second angular state in the absence of the actuation voltage $V_A$, or in the presence of a maintaining voltage $V_M$ applied to the electrode 22. The exact value of the holding voltage $V_H$ will depend upon a number of factors including the size of the holding electrodes 24 and the spacing between the moveable member 12 and the holding electrodes 24 (e.g. due to the end-stops 30 or due to an insulating layer overlying the electrodes 24) when the MEM device is in the second angular state. As an example, the holding voltage $V_H$ can be in the range of 10–30 volts.

Once the MEM device 12 has been switched to the second angular state and the holding voltage $V_H$ applied, a maintaining voltage $V_M$ can be substituted for the actuation voltage $V_A$ on electrode 22. The maintaining voltage $V_M$ will hold the MEM device 10 latched in the second state so that the holding voltage $V_H$ can be removed. The requirements for the maintaining voltage $V_M$ are similar to those for the holding voltage $V_H$ (i.e. $V_M$ should be sufficient to maintain the device 10 latched in the second angular state, but not to switch the device 10 from the first angular state to the second angular state either alone or in the presence of the holding voltage $V_H$). The exact value of the maintaining voltage $V_M$ can be the same or different from the holding voltage $V_H$ and will depend upon the size of the electrode 22 to which the maintaining voltage $V_M$ is applied and whether the same voltage source is used to provide both the maintaining and holding voltages. Those skilled in the art will understand that the various voltages (i.e. the actuation voltage, the holding voltage, and the maintaining voltage) used for operation of the MEM devices 10 in the array 100 can be provided by one or more power sources (e.g. batteries, power supplies, voltage sources, etc.) which can be computer controlled, microprocessor controlled or controlled by electronic circuitry.

Figure 3:
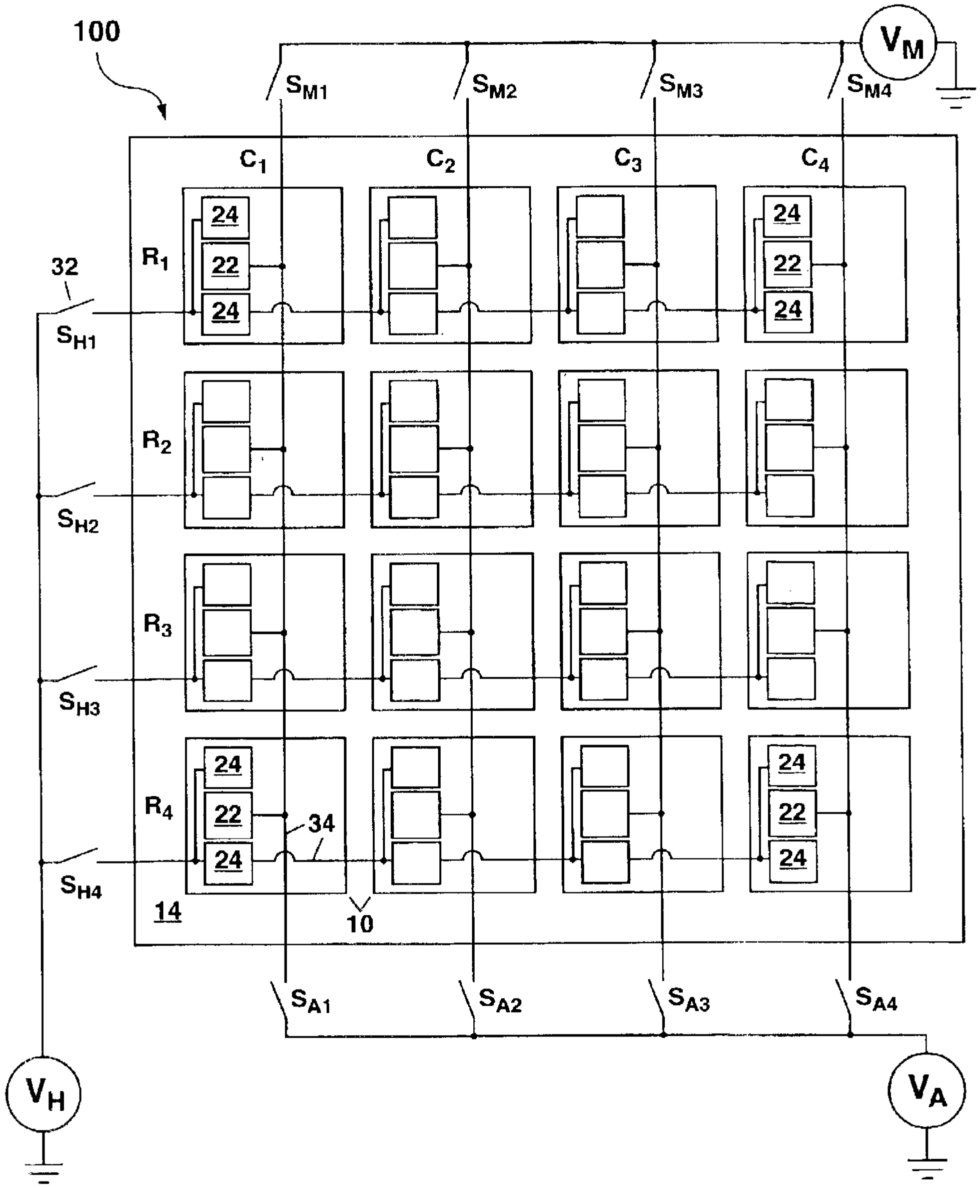
FIG. 3 shows a schematic plan view of an array of MEM devices as in FIG. 1 to illustrate a first embodiment of the method of the present invention for electrically addressing the array using the electrodes underlying the moveable member which has been omitted from FIG. 3 for clarity.

FIG. 3 shows a schematic plan view of an array 100 of MEM devices 10 to illustrate a first embodiment of the method of the present invention for electrically addressing the array 100. In FIG. 3, only the substrate 14 and the electrodes 22 and 24 are shown with an outline of each MEM device 10 for clarity. The array 100 in the example of FIG. 3 comprises sixteen MEM devices 10, but in general, the array 100 can have an arbitrary number of MEM devices 10 arranged in an m×n array where m and n are integers which can range up to 1000 or more so that the total number of MEM devices 10 in the array 100 can be up to $10^6$ or more. The individual MEM devices 10 in the array 100 can packed closely together with a spacing between adjacent MEM devices 10 being on the order of one micron.

In FIG. 3, the MEM devices 10 in the array 100 are arranged in rows and columns. The term "row" as used herein refers to an arbitrarily-selected axis or direction in the array 100 along which a plurality of MEM devices 10 are lined up; and the term "column" as used herein refers to another axis or direction in the array 100 that is orthogonal to the arbitrarily-selected axis for the "rows" in the array 100. In the discussion hereinafter for the various embodiments of the present invention, the term "row" will be used to represent an axis which is oriented in a side-to-side direction, and the term "column" will be used to represent an axis which is oriented in an up-and-down direction. However, there is no intent herein to limit the term "row" to being oriented side-to-side for all embodiments of the present invention, or to limit the term "column" to being oriented up-and-down for all embodiments of the present invention. Those skilled in the art will understand that the terms "rows" and "columns" can be interchanged without affecting the operability of the various embodiments of the present invention described herein.

Returning to FIG. 3, the rows of the array 100 are identified by the labels $R_1$, $R_2$, $R_3$ and $R_4$; and the columns are identified by the labels $C_1$, $C_2$, $C_3$ and $C_4$. Also shown in FIG. 3 are a plurality of switches 32 which can be used to connect the holding voltage $V_H$ to one or more rows of the array 100, and to connect the actuation voltage $V_A$ and the maintaining voltage $V_M$ to the columns of the array 100. The switches 32 can be electrically connected to a plurality of bond pads (not shown) formed on the substrate 14 with electrical wiring 34 on the substrate 14 (e.g. formed from a deposited and patterned layer of polysilicon) then being used to make the electrical interconnections to the electrodes 22 and 24 for each MEM device 10. The switches 32 in FIG. 3, which are preferably electronic switches (e.g. formed from a switching transistor), can be software controlled and can reside within a computer or microcontroller or electronic circuitry that is used to electrically address the array 100.

To electrically address the MEM array 100 in FIG. 3, all of the MEM devices 10 in a particular column (e.g. column $C_1$) are electrostatically switched from a first state as shown in FIG. 2A to a second state as shown in FIG. 2B. This can be done by closing switch $S_{A1}$ to connect the actuation voltage $V_A$ to the actuation electrode 22 within each MEM device 10 in column $C_1$, with the moveable member 12 preferably being electrically grounded.

With each MEM device in column $C_1$ switched to the second state, the holding voltage $V_H$ can be applied to one or more selected rows $R_1$–$R_4$ to select a set of MEM devices 10 located at the intersection of the rows with column $C_1$. This can be done by closing one or more of switches $S_{H1}$–$S_{H4}$. Closing a particular switch $S_{H1}$–$S_{H4}$ applies the holding voltage $V_H$ to the pair of holding electrodes 24 within each MEM device 10 in the selected row. However, since the holding voltage $V_H$ is not of sufficient magnitude (i.e. voltage) to switch any MEM device 10 in that row from the first state to the second state, but is only of sufficient magnitude to maintain a MEM device 10 already in the second state in that same state after removal of the actuation voltage $V_A$ from column $C_1$, then the effect of the holding voltage $V_H$ is to select the MEM device 10 at the intersection of that row and column $C_1$ for the set of MEM devices 10 which will remain latched in the second state once the actuation voltage $V_A$ is removed from column $C_1$. As an example, closing switches $S_{H2}$ and $S_{H4}$ would select the MEM devices 10 located at the intersection of rows $R_2$ and $R_4$ with column $C_1$ for the above set of MEM devices 10.

Once the set of MEM devices 10 has been selected for column $C_1$ as described above, all of the MEM devices 10 in column $C_1$ of the array 100 can be switched from the second state back to the first state with the exception of the set of MEM devices 10 selected above by addressing particular rows with the holding voltage $V_H$. This can be done by first removing the actuation voltage $V_A$ by opening switch $S_{A1}$ while the holding voltage $V_H$ is left in place to hold the selected set of MEM devices 10 in the second state. A maintaining voltage $V_M$ can then be applied to all of the MEM devices 10 in column $C_1$ by closing switch $S_{M1}$ in FIG. 3. Once this has been done, the holding voltage $V_H$ can be removed from the set of MEM devices 10 by opening any of the switches $S_{H1}$–$S_{H4}$ which were previously closed to select the set of the MEM devices 10. The maintaining voltage $V_M$ will then take over and hold the selected set of the MEM devices 10 latched in the second state for column $C_1$ until such time as the maintaining voltage $V_M$ is removed.

Figure 7:
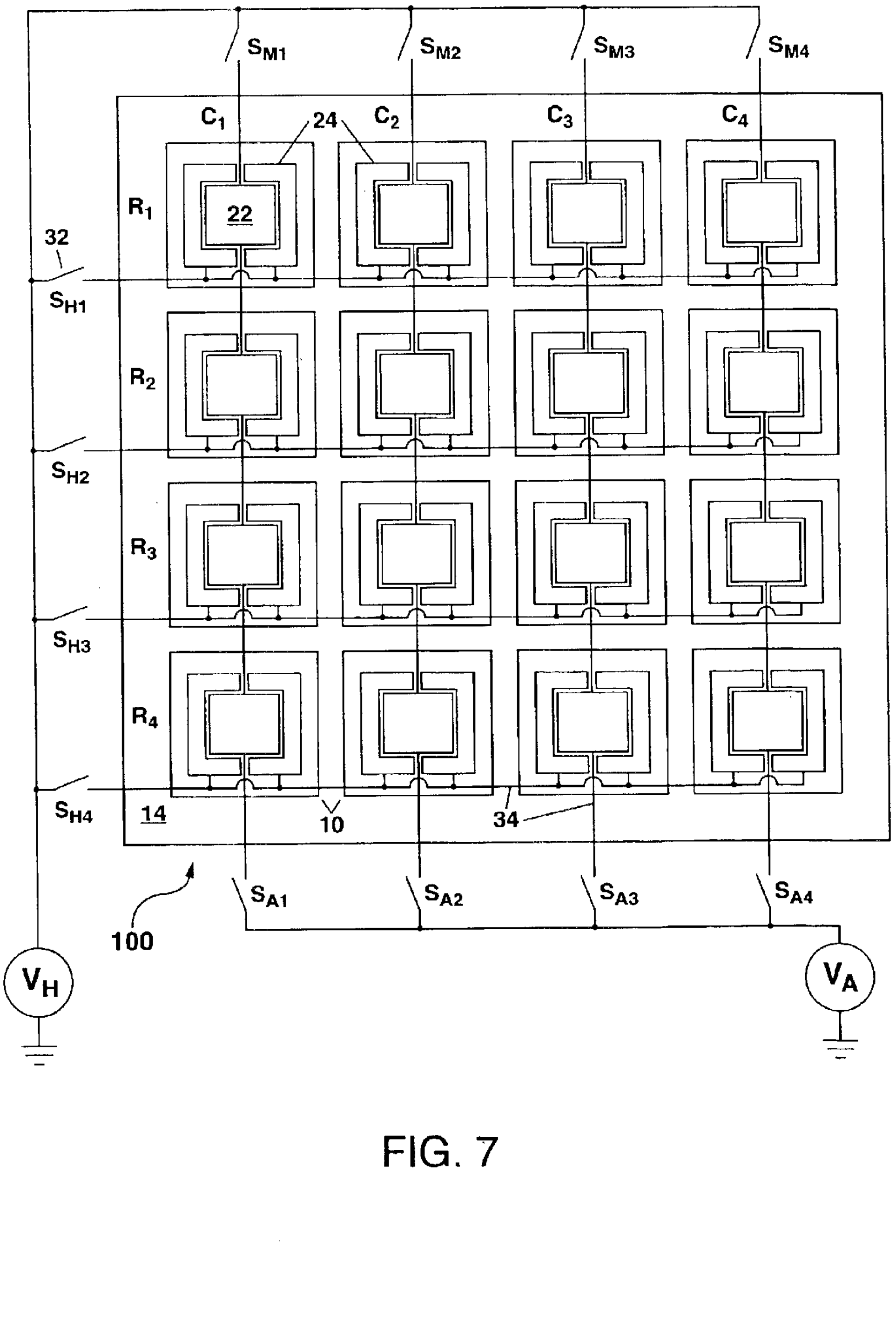
FIG. 7 shows a schematic plan view of an array of MEM devices as in FIG. 5 to illustrate a third embodiment of the method of the present invention for electrically addressing the array using the electrodes underlying the moveable member which has been omitted from FIG. 7 for clarity.

The maintaining voltage $V_M$ is characterized by being of insufficient magnitude (i.e. voltage) to switch any of the MEM devices 10 in column $C_1$ from the first state to the second state either alone or in the presence of the holding voltage $V_H$, but is of sufficient magnitude to maintain the MEM devices 10 in column $C_1$ latched in the second state after removal of the actuation voltage $V_A$ and after removal of the holding voltage $V_H$. The maintaining voltage $V_M$ need not be equal in magnitude to the holding voltage $V_H$, although in some embodiments of the present invention, the maintaining voltage $V_M$ and the holding voltage $V_H$ can be the same, and can even be provided by the same source $V_H$ (e.g. by omitting $V_M$ from FIG. 3 and connecting switches $S_{M1}$–$S_{M4}$ to $V_H$ as shown in FIG. 7).

With the set of MEM devices 10 selected for column $C_1$ and maintained in the second state after removal of $V_A$ and $V_H$, the above process can be repeated for each additional column $C_2$–$C_4$ in turn until the entire MEM array 100 has been electrically addressed to define the state of each MEM device 10 therein. The MEM array 100 after having been electrically addressed and programmed as described above will remain programmed (i.e. latched) indefinitely until the maintaining voltage $V_M$ is removed from the array 100 (e.g. by switching off the maintaining voltage $V_M$, or by opening switches $S_{M1}$–$S_{M4}$).

FIG. 4 shows a second embodiment of the method of the present invention which is suitable for electrically addressing an array 100 of MEM devices 10 which each have a separate maintaining electrode 36. In FIG. 4, the various electrodes 22, 24 and 36 are shown nested for each MEM device 10, although those skilled in the art will understand that other arrangements of these electrodes are possible. This embodiment of the present invention operates similar to the first embodiment described with reference to FIG. 3 except that the actuation voltage $V_A$ and the maintaining voltage $V_M$ are provided to different electrodes, 22 and 36, respectively. This arrangement allows each electrode 22, 24 and 26 to be independently sized for operation at a predetermined voltage or voltage range. An appropriate sizing of the electrodes 22, 24 and 26 can allow one or more of the voltages $V_A$, $V_H$ and $V_M$ to be equal to each other while providing different levels of electrostatic force on the moveable member 12 for operation of each MEM device 10.

The electrostatic force of attraction F between a pair of parallel plates (e.g. one of the electrodes 22, 24 or 26 and the moveable member 12) is given by:

$$F = \frac{\varepsilon A V^2}{2(g_0 - x)^2}$$

where $\epsilon$ is the permittivity of a medium (e.g. air or vacuum) separating the plates, A is an effective area of the plates (generally equal to the size of the electrodes), V is the voltage applied between the plates, $g_0$ is an initial gap between the plates, and x is a distance that one of the plates moves away from its initial position toward the other plate. The above equation shows that a trade-off can be made between the size (i.e. effective area A) and the voltage V to provide a predetermined level of electrostatic force F for each of the electrodes 22, 24, and 36 as required for operation of the devices 10 in the array 100 and for electrically addressing the array.

Figure 5:
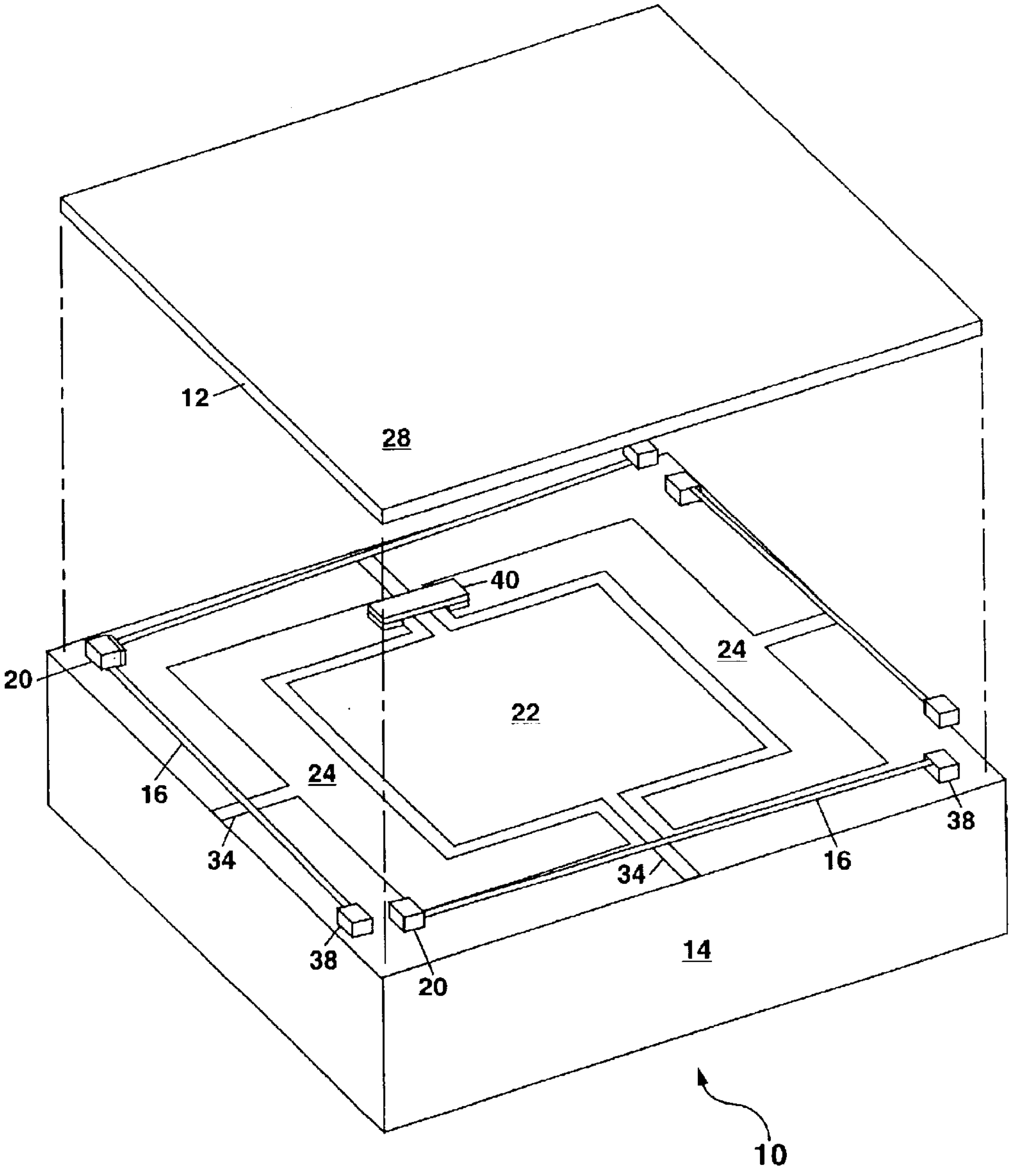
FIG. 5 schematically illustrates in an exploded perspective view another example of a MEM device that can be used to form a MEM array which can be electrically addressed using a third embodiment of the method of the present invention.

FIG. 5 schematically illustrates in an exploded perspective view yet another example of a MEM device 10 that can be used to form a MEM array 100 which can be addressed using an embodiment of the method of the present invention. In FIG. 5, the MEM device 10 comprises a moveable member 12 supported above a substrate 14 by a plurality of springs 16. Each spring 16 is connected at one end thereof to a support 38 attached to the substrate 14 and at the other end thereof to a leg 20 which is attached to an underside of the moveable member 12 (see FIG. 6A), but which has been shown detached in FIG. 5 for clarity. An actuation electrode 22 is provided underneath the moveable member 12 to permit the member 12 to be urged downward by an electrostatic force of attraction which is generated when the actuation voltage $V_A$ is applied between the actuation electrode 22 and the member 12. The moveable member 12 is preferably maintained at ground electrical potential (e.g. by an electrical connection formed through the springs 16).

The MEM device 10 in the example of FIG. 5 does not provide a tilting action, but instead provides a vertical movement of the moveable member 12 while maintaining the coplanarity of the member 12 with the underlying substrate 14. This is shown in FIGS. 6A and 6B.

Figure 6A:
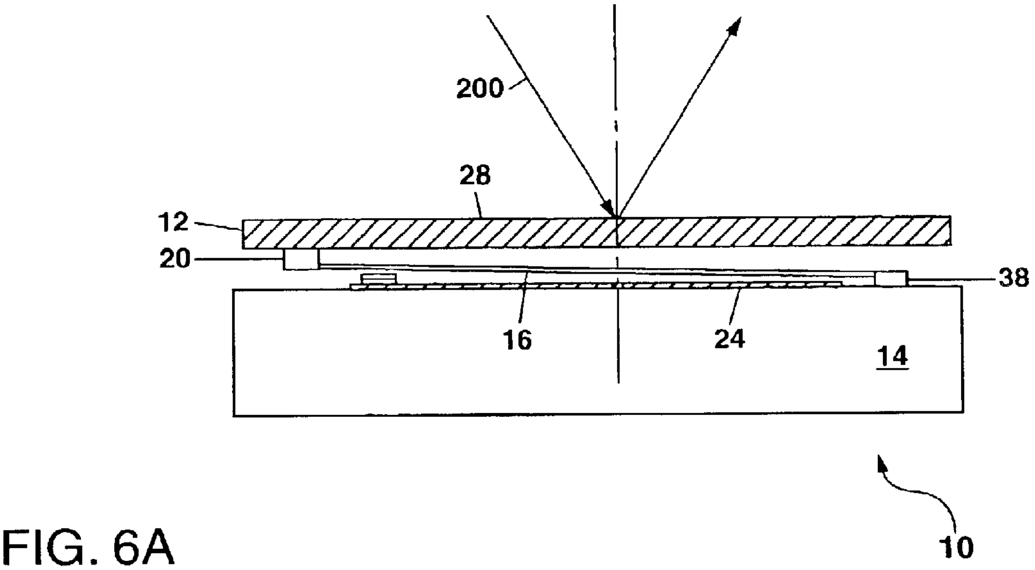
FIGS. 6A and 6B show schematic side views of the MEM device of FIG. 5 to illustrate switching of the device between a pair of states therein.

FIG. 6A shows a schematic cross-section view of the MEM device 10 of FIG. 5 in an "as-formed" state (i.e. a first state). The term "as-formed" state as used herein refers to the state of the MEM device 10 just after formation thereof and prior to the application of any voltages thereto. The "as-formed" state as used herein can also refer to a rest position of the MEM device 10 to which the MEM device 10 returns when all voltages have been removed.

Figure 6B:
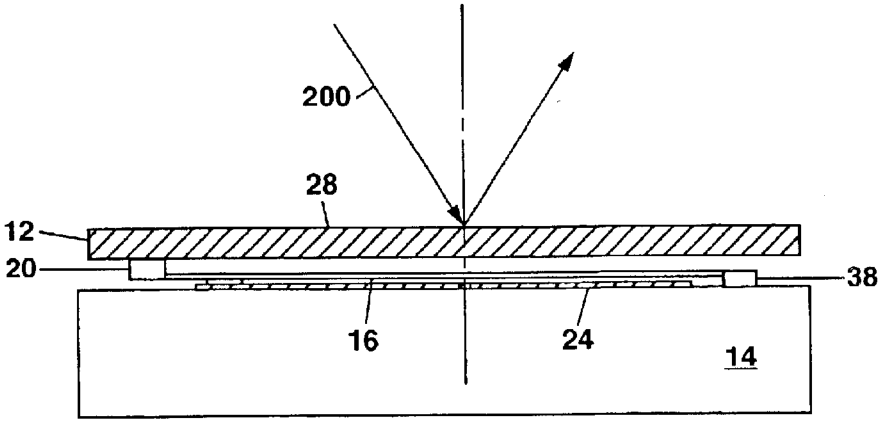

In FIG. 6B, the MEM device 10 has been switched to a second state wherein the moveable member 12 is moved closer to the underlying substrate 12 by up to a few microns by application of the actuation voltage $V_A$ to the electrode 22. Once the MEM device 10 has been switched to the second state, it can be held in this state by a holding voltage $V_H$ applied to one or more holding electrodes even after removal of the actuation voltage $V_A$. In the example of FIG. 5 a pair of holding electrodes 24 are used surrounding the actuation electrode 22 and electrically connected together by an electrically-conducting bridge 40 (e.g. formed from one or more layers of doped polysilicon).

Switching the MEM device 10 between the first and second states is useful for producing a phase difference (i.e. a phase shift) in a reflected portion of an incident light beam 200 since the light beam 200 travels over slightly different paths in FIGS. 6A and 6B. Phase shifting of light beams 200 is useful for many different types of applications including optical phase correction, optical imaging, optical switching, projection displays and the formation of optical memories.

In a MEM array 100 formed from a plurality of MEM devices 10 as shown in the example of FIG. 5, the phase shift of each device 10 can be controlled and switched using an embodiment of the electrical addressing method of the present invention. As an example, FIG. 7 shows a third embodiment of the addressing method of the present invention that requires only two voltage sources $V_A$ and $V_H$ for operation of an array 100 of the MEM devices 10 in FIG. 5. In FIG. 7, the voltage source $V_A$ refers to the actuation voltage and the voltage source $V_H$ refers to the holding voltage, both of which have been described in detail previously. In this embodiment of the present invention, a voltage source providing the maintaining voltage $V_M$ is not necessary since the function of the maintaining voltage source $V_M$ is provided by the holding voltage source $V_H$.

In the embodiment of the method of the present invention illustrated with reference to FIG. 7, to electrically address the MEM array 100 the actuation voltage $V_A$ is initially provided to column $C_1$ of the array 100 by closing switch $S_{A1}$ thereby electrostatically switching all of the MEM devices 10 in column $C_1$ from the first state to the second state. One or more of switches $S_{H1}$–$S_{H4}$ can then be closed to provide the holding voltage $V_H$ to select a set of MEM devices 10 located at the intersection of one or more of the rows $R_1$–$R_4$ and column $C_1$. The effect of the holding voltage $V_H$ as described previously is to select a set of MEM devices 10 in column $C_1$ and to hold this set of devices 10 latched in the second state after removal of the actuation voltage $V_A$.

Once the set of MEM devices 10 has been selected for column $C_1$, all of the remaining MEM devices 10 in column $C_1$ can be switched from the second state back to the first state by opening switch $S_{A1}$ and thereby removing the actuation voltage $V_A$ from column $C_1$. With the actuation voltage $V_A$ removed, switch $S_{M1}$ can be closed to provide the holding voltage $V_H$ to the column $C_1$ after which time all of the switches $S_{H1}$–$S_{H4}$ that were previously closed to select the set of MEM devices for column $C_1$ can be opened thereby removing the holding voltage $V_H$ from all rows in the MEM array 100. The above process can then be repeated for each additional column $C_2$–$C_4$ in turn until the entire MEM array 100 has been electrically addressed to define the state of each MEM device 10 therein.

The MEM array 100 after having been electrically addressed and programmed as described above to store information therein will remain programmed (i.e. latched) indefinitely until the holding voltage $V_H$ is removed from each column of the array 100 by opening switches $S_{M1}$–$S_{M4}$ or by switching off the source providing the holding voltage $V_H$. The information stored in the MEM array 100 in FIG. 7 can be read out optically by providing one or more light beams 200 incident on the array, with each light beam 200 generating a reflected light beam that contains phase information due to the state of one or more of the MEM devices 10. Alternately, the MEM array 100 can be read out electrically by sensing the capacitance of the electrodes 22 or 24 (e.g. by using an a.c. voltage provided to the electrodes 22 or 24 concurrently with the voltages $V_A$ and $V_H$ or provided separately).

Although the third embodiment of the present invention has been described with reference to a 4×4 MEM array 100 in FIG. 7, those skilled in the art will understanding that the teachings of the present invention can be applied to a MEM array 100 of arbitrary size (i.e. a m×n array where m and n are arbitrary integer numbers).

Other applications and variations of the present invention will become evident to those skilled in the art. For example, some embodiments of the method of the present invention can be applied to electrically addressing of an array of devices (e.g. moveable or tiltable mirrors) which are formed with millimeter-sized dimensions using a LIGA process as known to the art. The term "LIGA" is an acronym for "Lithographic Galvanoforming Abforming" a process for fabricating millimeter-sized electrical devices based on building up the structure of the LIGA devices by photolithographic definition using an x-ray or synchrotron source and metal plating or deposition. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A method for electrically addressing an array of two-state microelectromechanical (MEM) devices, comprising steps for:

(a) switching all of the MEM devices in a column of the array from a first state to a second state;

(b) selecting a set of the MEM devices located at an intersection of at least one row of the array and the column, with the set of MEM devices being in the second state;

(c) switching all the MEM devices in the column of the array, except for the set of the MEM devices, from the second state to the first state; and (d) repeating steps (a)–(c) for each column of the array.

2. The method of claim 1 wherein the step for switching all of the MEM devices in the column of the array from the first state to the second state comprises applying an actuation voltage to all of the MEM devices in the column of the array for electrostatically switching the MEM devices from the first state to the second state.

3. The method of claim 2 wherein the step for selecting the set of the MEM devices comprises applying a holding voltage to all of the MEM devices in the row of the array, with the holding voltage being of insufficient magnitude to switch any of the MEM devices in the row from the first state to the second state, but being of sufficient magnitude to maintain the set of MEM devices in the second state after removal of the actuation voltage.

4. The method of claim 3 wherein the step for switching all the MEM devices in the column of the array, except for the set of the MEM devices, from the second state to the first state comprises:

(a) removing the actuation voltage from all the MEM devices in the column of the array;

(b) applying a maintaining voltage to all the MEM devices in the column of the array; and (c) removing the holding voltage from all the MEM devices in the row of the array.

5. The method of claim 3 wherein applying the actuation voltage to all of the MEM devices in the column of the array comprises applying the actuation voltage to a first electrode underlying a moveable member of each MEM device in the column of the array.

6. The method of claim 5 wherein applying the holding voltage to all of the MEM devices in the row of the array comprises applying the holding voltage to a second electrode underlying the moveable member of each MEM device in the row of the array.

7. The method of claim 1 further comprising a step for sensing whether one of the MEM devices in the array is in the first state or in the second state at an instant in time.

8. The method of claim 7 wherein the step for sensing comprises capacitively sensing whether the MEM device is in the first state or in the second state.

9. The method of claim 7 wherein the step for sensing comprises optically sensing whether the MEM device is in the first state or in the second state.

10. The method of claim 1 wherein each MEM device in the array comprises a micromirror or a memory element or both.

11. A method for electrically addressing an array of two-state microelectromechanical (MEM) devices, comprising steps for:

(a) applying an actuation voltage to all of the MEM devices in a column of the array, thereby electrostatically actuating all of the MEM devices in the column;

(b) applying a holding voltage to all of the MEM devices in at least one row of the array, thereby selecting the MEM devices located at an intersection of the row and the column, with the holding voltage being of insufficient magnitude to electrostatically actuate any of the MEM devices in the row, but being of sufficient magnitude to maintain the actuation of the MEM devices located at the intersection of the row and the column when the actuation voltage to the column is removed;

(c) removing the actuation voltage from the column, and applying a maintaining voltage to the column;

(d) removing the holding voltage from the row; and (e) repeating steps (a)–(d) for each column in the array.

12. The method of claim 11 wherein the step for applying the actuation voltage to all of the MEM devices in the column of the array comprises applying the actuation voltage to a first electrode underlying a moveable member of each MEM device in the column of the array thereby electrostatically changing a position of the moveable member from a first state to a second state.

13. The method of claim 12 wherein the step for applying the holding voltage to all of the MEM devices in the row of the array comprises applying the holding voltage to a second electrode underlying the moveable member of each MEM device in the row of the array.

14. The method of claim 12 wherein the first state is defined by the moveable member being coplanar with a substrate whereon the array is formed.

15. The method of claim 14 wherein the second state is defined by the moveable member being tilted at an angle to the substrate.

16. The method of claim 12 wherein the first state is defined by the moveable member being located in an as-formed position.

17. The method of claim 16 wherein the second state is defined by the moveable member being displaced downward from the as-formed position.

18. The method of claim 12 wherein the first state is defined by the moveable member being oriented at an angle to a substrate whereon the array is formed.

19. The method of claim 18 wherein the second state is defined by the moveable member being oriented at a different angle with respect to the substrate.

20. The method of claim 11 wherein the step for removing the actuation voltage from the column and applying the maintaining voltage to the column comprises removing the actuation voltage from the first electrode and applying the maintaining voltage to the first electrode.

21. The method of claim 11 wherein the step for removing the actuation voltage from the column and applying the maintaining voltage to the column comprises applying the maintaining voltage to another electrode underlying the moveable member of each MEM device in the column of the array.

22. The method of claim 11 further including a step for sensing the position of the moveable member of at least one MEM device in the array for determining a state of the MEM device.

23. The method of claim 22 wherein the step for sensing the position of the moveable member comprises capacitively sensing the position of the moveable member.

24. The method of claim 22 wherein the step for sensing the position of the moveable member comprises optically sensing the position of the moveable member.

25. The method of claim 11 wherein each MEM device in the array comprises a micromirror or a memory element or both.

26. A method for electrically addressing an array of two-state microelectromechanical (MEM) devices formed on a substrate, comprising steps for:

(a) applying an actuation voltage to all of the MEM devices in a column of the array, thereby electrostatically actuating all of the MEM devices in the column to change the position of a moveable member of each MEM device from a first state to a second state;

(b) selecting a set of the MEM devices in the column that will remain in the second state when a maintaining voltage having a magnitude less than the actuation voltage will be later substituted for the actuation voltage by:

(i) applying a holding voltage to at least one row of the array while the actuation voltage is applied to the column, thereby selecting the MEM devices having both the actuation voltage and the holding voltage applied thereto for the set of MEM devices, with the holding voltage being of insufficient magnitude to electrostatically actuate any of the MEM devices in the column, but being of sufficient magnitude to maintain any MEM device in the column to which the holding voltage is applied in the second state when the actuation voltage is no longer present;

(ii) substituting the maintaining voltage for the actuation voltage while retaining the holding voltage in place;

(iii) removing the holding voltage; and (c) repeating steps (a) and (b) in turn for each additional column in the array.

27. The method of claim 26 wherein each MEM device in the array of MEM devices comprises a micromirror or a memory element or both.

* * * * *